Jan. 28, 1969  C. W. ROBEY  3,424,374

BEARING LUBRICATION DEVICE

Filed April 17, 1967

United States Patent Office 3,424,374
Patented Jan. 28, 1969

3,424,374
BEARING LUBRICATION DEVICE
Charles William Robey, Derby, England, assignor to Rolls-Royce Limited, Derby, England, a British company
Filed Apr. 17, 1967, Ser. No. 631,352
Claims priority, application Great Britain, May 11, 1966, 20,950/66
U.S. Cl. 230—206       9 Claims
Int. Cl. F04b *39/02;* F02c *7/06*

ABSTRACT OF THE DISCLOSURE

A shaft bearing lubrication device has a conduit which supplies lubricant to the bearing, the conduit comprising a pump the output of which is independent of the speed of shaft and a valve which regulates the flow of the lubricant to the bearing in response to a fluid pressure which is itself a function of the shaft speed.

---

This invention concerns a shaft bearing lubrication device and, although the invention is not so restricted, it is more particularly concerned with a device adapted for the lubrication of a shaft bearing in a gas turbine engine.

According to the present invention, there is provided a shaft bearing lubrication device comprising a shaft which is rotatably mounted within a bearing, a lubricant conduit which contains a pump, which is driven independently of the rotational speed of the shaft and through which lubricant may be supplied to the bearing, and valve means situated in the conduit and controlled in functional dependence upon the rotational speed of the shaft, for controlling the flow of lubricant through the lubricant conduit so that the rate at which lubricant is supplied to the bearing is functionally related to said speed.

The valve means may comprise a throttle valve, e.g., a needle valve. The said throttle valve may be adjusted by a pressure responsive member which is responsive to a fluid pressure functionally related to said speed.

The pressure responsive member may be a diaphragm opposite sides of which are respectively subjected to the said fluid pressure and to the pressure of the lubricant downstream of said throttle valve.

The flow of lubricant to the bearing may be regulated proportionally to the square root of the shaft speed.

The invention also comprises a gas turbine engine provided with a shaft bearing lubrication device as set forth above, the said shaft carrying compressor means and turbine means of the engine. Thus, the said fluid pressure may be provided by air bled from a compressor of the engine.

Figure 1:
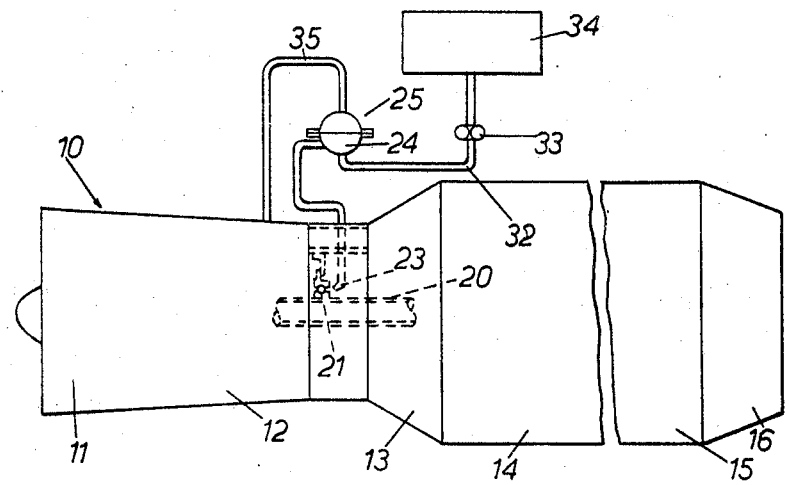
Figure 2:
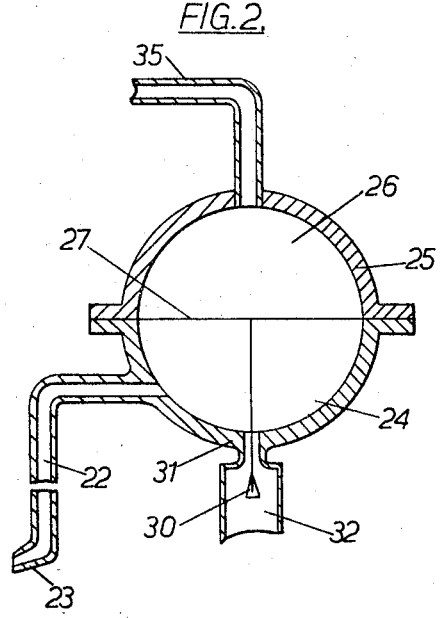

The invention is illustrated, merely by way of example, in the accompanying drawings, in which:

FIGURE 1 is a diagrammatic view of a gas turbine engine provided with a shaft bearing lubrication device in accordance with the present invention, and FIGURE 2 is a sectional view on a larger scale of part of the structure shown in FIGURE 1.

Referring to the drawings, a gas turbine engine 10 comprises in flow series a low pressure compressor 11, an high pressure compressor 12, combustion equipment 13, a high pressure turbine 14, a low pressure turbine 15, and a final nozzle 16.

The high pressure turbine 14 and the high pressure compressor 12 are mounted on a common shaft 20.

Mounted concentrically within the shaft 20 is a further shaft (not shown) on which are mounted the low pressure compressor 11 and the low pressure turbine 15.

The shaft 20 is mounted within a bearing 21 which is supplied with lubricant by way of a lubricant conduit 22 at whose downstream end there is a nozzle 23 through which lubricant is directed to the bearing 21.

The lubricant conduit 22 communicates with a chamber 24 within a valve device having a spherical body 25. The said valve device has a chamber 26 therein which is separated from the chamber 24 by a diaphragm 27. A needle valve 30, which is connected to the diaphragm 27, controls the effective size of an aperture 31 in the wall of the chamber 24, the aperture 31 communicating with a lubricant conduit 32. The lubricant conduit 32, which contains an electrically driven pump 33, is supplied with lubricant from a tank 34. The pump 33 is thus driven independently of the rotational speed of the shaft 20. The chamber 26 communicates by way of a pipe 35 with one of the downstream stages of the high pressure compressor 12.

Accordingly, opposite sides of the diaphragm 27 will be respectively subjected to the pressure from the high pressure compressor 12 and the pressure of the lubricant in the chamber 24, i.e., the pressure of the lubricant downstream of the needle valve 30. The diaphragm 27, movements of which cause the needle valve 30 to alter the effective area of the aperture 31, will tend to make these pressures equal to each other, with the result that the rate at which lubricant is supplied via the nozzle 23 to the bearing 21 will depend upon the pressure of the air in the pipe 35 and will therefore be functionally related to the rotational speed of the shaft 20.

The rate at which lubricant is supplied to the bearing 21 is in fact proportional to the square root of the pressure drop across the nozzle 23 and so is proportional to the square root of the engine speed.

I claim:

1. A shaft bearing lubrication device comprising a bearing, a shaft rotatably mounted therein, a lubricant conduit through which lubricant may be supplied to the bearing, a pump disposed within the conduit, means to drive the pump independently of the speed of rotation of the shaft, and valve means situated in the conduit and which regulates the flow of lubricant through the lubricant conduit to the bearing as a function of the said shaft speed.

2. A device as claimed in claim 1 in which the valve means comprises a throttle valve.

3. A device as claimed in claim 2 in which the throttle valve is a needle valve.

4. A device as claimed in claim 2 comprising a pressure responsive member which adjusts the throttle valve in response to a fluid pressure functionally related to said speed.

5. A device as claimed in claim 4 in which the pressure responsive member is a diaphragm opposite sides of which are respectively subjected to the said fluid pressure and to the pressure of the lubricant downstream of said throttle valve.

6. A gas turbine engine provided with a device as claimed in claim 1, the compressor means and turbine means of the engine being mounted on the shaft.

7. A gas turbine engine as claimed in claim 6 wherein the valve means is a throttle valve, a fluid pressure responsive member adjusting the throttle valve in response to the pressure of air bled from the said compressor means.

8. A gas turbine engine as claimed in claim 7 having a high pressure compressor, the said air being bled from the downstream end of the high pressure compressor.

9. A shaft bearing lubrication device as claimed in claim 1 wherein the flow of lubricant to the bearing is regulated proportionally to the square root of the shaft speed.

References Cited

UNITED STATES PATENTS 2,990,915   7/1961   Anders _____ 184—6

ROBERT M. WALKER, *Primary Examiner.*

U.S. Cl. X.R.

60—39.08; 184—6